United States Patent [19]
Morimoto et al.

[11] 3,728,363
[45] Apr. 17, 1973

[54] QUINONE DERIVATIVES

[75] Inventors: Hiroshi Morimoto, Hyogo; Masazumi Watanabe, Takatsuki; Isuke Imada, Osaka, all of Japan

[73] Assignee: Takeda Chemical Industries, Ltd., Osaka, Japan

[22] Filed: Mar. 15, 1971

[21] Appl. No.: 124,545

[30] Foreign Application Priority Data

Mar. 17, 1970 Japan ................................45/22497
Mar. 18, 1970 Japan ................................45/22805

[52] U.S. Cl. ............260/396 R, 260/521 R, 424/305, 424/315, 424/316
[51] Int. Cl. .........................C07c 61/36, C07c 69/74
[58] Field of Search ..................................260/396 R

[56] References Cited

UNITED STATES PATENTS 2,398,418    4/1946   Fieser ..............................260/396 R

*Primary Examiner*—Vivian Garner
*Attorney*—Wenderoth, Lind & Ponack

[57] ABSTRACT

Compounds of the formula

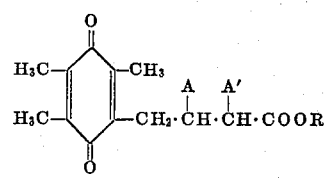

wherein one of A and A' represents hydrogen and the other is a lower alkyl group and R is hydrogen, alkyl, cycloalkyl or unsaturated alkyl and pharmaceutically acceptable salts thereof have vitamin E and anti-inflammatory action.

5 Claims, No Drawings

3,728,363

QUINONE DERIVATIVES

The present invention relates to novel quinone derivatives, their alkyl esters and their pharmaceutically acceptable salts, which have effective vitamin E and anti-inflammatory action. The present invention also relates to intermediates for these novel quinone derivatives and to a method for the production of these novel quinone derivatives and their intermediates.

The present inventors have made extensive studies on quinone derivatives to succeed in synthesizing present novel quinone derivatives and found out that these novel quinone derivatives have effective vitamin E action, and anti-inflammatory action due to their stabilizing activity of lysosomal membrane. The present invention was accomplished on the basis of these findings.

Thus, the principal object of the present invention is to provide these novel compounds, their alkyl esters and their pharmaceutically acceptable salts useful as medicines such as vitamin E or anti-inflammatory agents. Another object of the present invention is to provide intermediates for these novel quinone derivatives and also to provide an industrially feasible method for the production of these novel compounds and their intermediates.

The object compounds of the present invention are those represented by the following general formula (I)

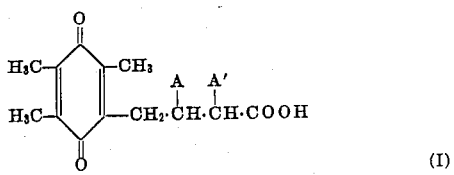

(I)

(wherein one of A and A' is a hydrogen atom and the other is a lower alkyl group) or their pharmaceutically acceptable salts.

In the following, detailed explanation is made of the present invention.

In the general formula (I), the lower alkyl groups represented by the symbol A or A' are preferably those having one to four carbon atoms. Typical examples of the group are methyl, ethyl, propyl, isopropyl, butyl, isobutyl, sec-butyl, and tert-butyl.

The present compounds (I) are produced by reacting a compound (II)

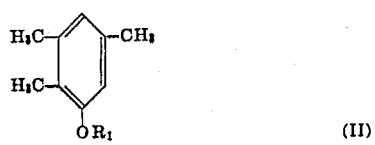

(II)

(wherein $R_1$ stands for a hydrogen atom or a lower alkyl group) with a compound (III)

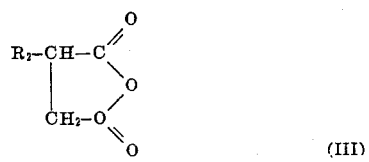

(III)

(wherein $R_2$ stands for a lower alkyl group corresponding to the lower alkyl group represented by the symbol A or A') to give a compound (IV)

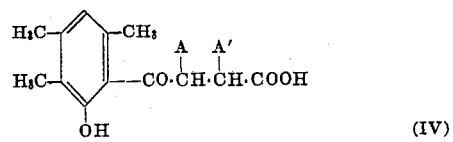

(IV)

(wherein A and A' have the same meaning as above), and subjecting the product to reduction of the carbonyl group and to oxidation of the phenol nucleus.

In the above general formula, the lower alkyl groups represented by the symbol $R_2$ have the same meaning with the lower alkyl group represented by the symbol A or A'.

In the reaction of a compound (II) with a compound (III), according to the manner of cleavage of a compound (III), a mixture of products represented by the following general formula (IV-a) and (IV-b) are produced. A compound (IV-a) is a compound (IV) wherein A is $R_2$, and a compound (IV-b) is a compound (IV) wherein A' is $R_2$.

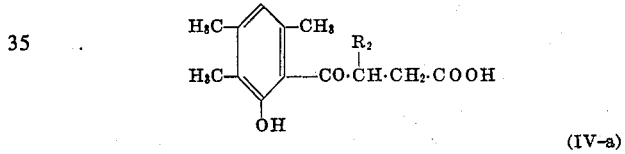

(IV-a)

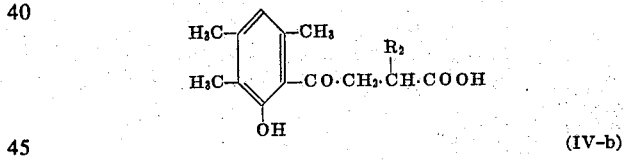

(IV-b)

(wherein $R_2$ has the same meaning as above)

The two kinds of the products can be separated into the respective compounds (IV-a) and (IV-b) after a conventional manner such as column chromatography, etc.

The reduction of the carbonyl group and the oxidation of the phenol nucleus of the compound (IV) may be conducted in optional order, and by the reactions in the said two steps, the compounds (IV) are converted into a compound (I) via the below-mentioned intermediate (V) or (VI).

The reactions involved in the above-mentioned processes are described below;

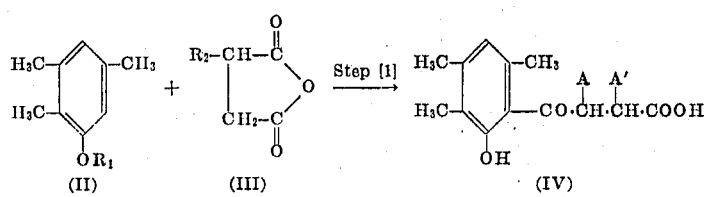

(II)    (III)    (IV)

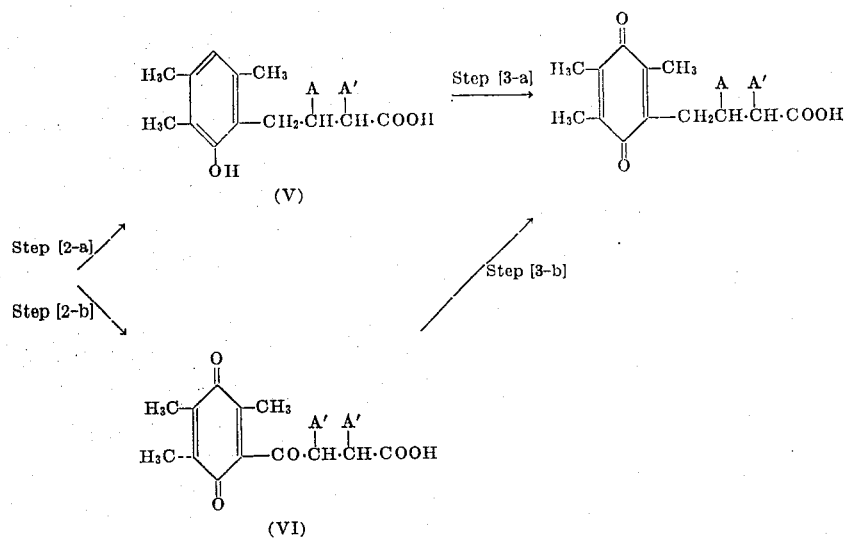

(V)

Step [2-a]
Step [2-b]
Step [3-b]

(VI)

(wherein $R_1$, $R_2$, A and A' have the same meaning as above)

As mentioned above, the Step [1] gives a mixture of the compounds (IV-a) and (IV-b). The mixture as it is may be subjected to the subsequent step [2-a] and then step [3-a] or subjected to step [2-b] and then step [3-b]. Alternatively, the mixture is separated into the respective compounds, and then each of the compounds may be subjected to the subsequent steps as mentioned above.

In a case where the mixture of the compound (IV-a) and (IV-b) is subjected to the subsequent steps, the final product (I) includes two compounds, namely, that wherein A is a lower alkyl group and A' is hydrogen and that wherein A is hydrogen and A' is a lower alkyl group. The mixed final products may be, if desired, separated into the respective compounds after a conventional manner such as extraction, distillation, recrystallization and a column chromatography, etc.

In this case, it is also possible that the separation be conducted at the stage of the compound (V) or (VI) and each of thus separated respective compounds is then subjected to the subsequent step [3-a] or step [3-b] to give the respective final products.

Both kinds of the final products have vitamin E and anti-inflammatory action and are equally useful as medicines mentioned as before.

The reaction of Step [1] is carried out by reacting a compound (II) with a compound (III). The amount of compound (III) is usually about 1 mole per mole of compound (II). The reaction proceeds even in the absence of a solvent, but is preferably conducted in a suitable inert solvent. Use of an acid catalyst is desirable for this reaction.

The acid catalyst may be exemplified by Lewis acids (e.g., aluminum halide such as aluminum chloride, aluminum bromide, zinc chloride, stannic chloride, phosphorus chloride, hydrogen fluoride, etc.), mineral acids (e.g., concentrated sulfuric acid, phosphoric acid, etc.).

The amount of the acid catalyst is generally about 2 moles or more, preferably about 3 moles, per mole of compound of the general formula (III).

Typical examples of the inert solvent are hydrocarbons or their derivatives such as carbon bisulfide, tetrachloro-ethane, benzene, nitrobenzene, toluene, chloroform, carbon tetrachloride or a mixture thereof.

The reaction can proceed at room temperature and under atmospheric pressure, but, if desired, may be conducted under heating, cooling or under elevated pressure. The reaction time varies with reaction conditions such as temperature, pressure, the kind of the acid catalyst and solvent used, but it is generally about 4 to 48 hours. The compounds (IV) are produced as a mixture of a compound (IV-a) and (IV-b), and, if desired, the mixture may be separated respectively by the per se known manners (e.g., silica-gel column chromatography, etc.). As a starting material of the next reaction step, a compound (IV-a), a compound (IV-b) or a mixture thereof may be all employable.

The reaction of Step [2-a] or Step [3-b] is carried out by reducing the carbonyl group of compound (IV) or compound (VI). As a method of the reduction of the carbonyl group, any one which can convert a carbonyl group into a methylene group may be employed.

The methods of the reduction may be exemplified by Clemmensen reduction using amalgamated zinc and hydrochloric acid, Wolff-Kishner reduction which comprises converting at first a ketone into a hydrazone and then decomposing the hydrazone in the presence of a base such as hydroxide of alkali metal (e.g., potassium hydroxide, sodium hydroxide, etc.), catalytic reduction which is conducted in hydrogen gas atmosphere in the presence of a conventional catalyst such as, platinum catalyst (e.g., platinum black), palladium catalyst (e.g., palladium black), nickel catalyst (e.g., Raney nickel, etc.) and the like, or a method which comprises reacting the compound with an alkyl mercaptan (e.g., methyl mercaptan, ethyl mercaptan, etc.) to convert carbonyl group into the corresponding dialkylthioacetal group and then allowing a catalyst such as nickel catalyst (e.g., Raney nickel, etc.) act upon the resultant, whereby reductive desulfurization takes place to give methylene group, etc.

For conducting the reduction of Step [3-b], Clemmensen reduction and catalytic reduction are most suitable. The detail reaction conditions and/or techniques for the above methods for reduction of a carbonyl group may be any of conventional ones which have hithertofore been applied in the art. When any one of the above-mentioned methods is applied to the steps, the reaction proceeds in the absence of a solvent at room temperature, but it is recommended to conduct the reaction in the presence of a suitable inert solvent and under heating at about boiling point of the solvent used or higher. The typical examples of the inert solvent are hydrocarbons or their derivatives such as alcohols (e.g., methyl alcohol, ethyl alcohol, ethylene glycol, triethylene glycol), ethyl ether, benzene, toluene, xylene, or a mixture of two or more thereof.

When the catalytic reduction is applied to the steps, the reaction proceeds even at atmospheric pressure, but it is more preferable to carry out the reduction under elevated pressure (e.g. 1 to 300 kg./cm$^2$).

The reaction of Step [2-b] or Step [3-a] is carried out by oxidizing the phenol nucleus of a compound (IV) or (V). As a method of the oxidation of the phenol nucleus, any one which can convert a phenol nucleus into a quinone nucleus may be employed. To accomplish the above mentioned purpose on the reaction of Step [2-b] or Step [3-a], oxidizing agents are generally employed. Typical examples of these oxidizing agents are potassium permanganate, potassium dichromate, chromic acid anhydride, potassium nitrosodisulfonate and peroxides such as hydrogen peroxide, performic acid, peracetic acid, perbenzoic acid.

The amount of the oxidizing agent is usually about 1 to 3 moles, more preferably about 2 moles per mole of a starting compound (IV) or (V). The oxidation reaction of Step [2-b] or Step [3-a] is generally carried out in a suitable inert solvent. Typical examples of these inert solvents are water, diluted mineral acids such as hydrochloric acid, sulfuric acid, nitric acid, diluted aqueous solution of alkaline substance such as alkali metal hydroxide (e.g., sodium hydroxide, potassium hydroxide), alkali metal carbonate (e.g., sodium carbonate, potassium carbonate), hydrocarbons or their derivatives such as acetone, alcohols (e.g., ethyl alcohol, methyl alcohol), dioxane, organic acids such as acetic acid or a suitable mixture thereof. The reaction conditions such as temperature, pressure, reaction time vary with kinds of the oxidizing agent or solvent used and amount of the starting compound employed.

A degree of completeness of the present reaction may be analyzed by thin-layer chromatography technique. In case of using thin-layer chromatography, for example, a color reaction with leucomethylene blue or significant ultraviolet absorption spots due to reaction product(s) and starting compounds may be used to confirm a degree of the proceeding of the present reaction.

After completion of the reaction, the compound (VI) or (I) may be isolated or purified by per se known means (e.g. extraction, distillation, recrystallization, etc.).

In respect to the object compounds (I), there are two kinds of optical isomer due to their intramolecular asymmetric carbon atom.

Thus, when an object compound (I) is obtained as a mixture of an l-isomer and an d-isomer, if desired, the mixture of the two isomers may be isolated respectively by per se known means of optical resolution (e.g., resolution of diastereoisomer). The compound (I) may be converted into its alkyl ester represented by the general formula (I')

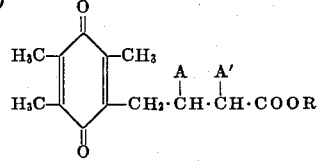

(wherein A and A' have the same meaning as above, R stands for an alkyl group) or its salt by per se known means in optional reaction steps of the above-mentioned reactions.

In the present specification, the group R of the above mentioned general formula (I') is, for convenience, referred to as alkyl group. However, it is to be noted, that the R may be straight or branched chain alkyl, cycloalkyl or unsaturated alkyl, preferably the R containing from one to six carbon atoms. Typical examples of the group are methyl, ethyl, propyl, isopropyl, allyl, butyl, isobutyl, sec-butyl, tert-butyl, pentyl, cyclopentyl, hexyl and cyclohexyl.

As mentioned above, pharmaceutically acceptable salts or alkyl esters of the compound (I) are easily produced by per se known means using a suitable base such as alkali metal hydroxides (e.g., sodium hydroxide, potassium hydroxide), alkali metal carbonates (e.g., sodium carbonate, potassium carbonate) or organic bases (e.g., methylamine, dimethylamine, etc.), etc. or using a suitable alcohol corresponding to the alkyl group represented by the symbol R or a suitable reagent (e.g. diazomethane, etc.).

When thus obtained compounds (I), their alkyl esters or their salts are employed as anti-inflammatories, the compounds are usually administered orally in an amount ranging from 25 milligrams to 800 milligrams per day for an adult.

In addition, it is to be noted that the compounds (I), their alkyl esters or their salts have effective vitamin E action, and therefore that those novel compounds can be used for treating the vitamin deficiency dieseases in place of natural vitamin.

For further explanation of the present invention, the following examples are given wherein the word "-part(s)" is based on weight unless otherwise noted and the relationship between "part" and "volume part" corresponds to that between gram and milliliter.

EXAMPLE 1

1. In 10 volume parts of tetrachloroethane is dissolved 4 parts of aluminum chloride, and to the solution are added dropwise under ice-cooling a solution of 2 parts of 2,3,5-trimethylphenol and 1.7 part of methyl-succinic acid anhydride in 10 volume parts of tetrachloroethane, followed by heating 135° to 140°C for 6 hours. The reaction mixture is poured into ice water, and the whole mixture is made acid with 3N hydrochloric acid, followed by subjecting to steam-distillation to remove tetrachloroethane. After cooling, the crystals separated from the residue are collected by filtration, washed with water and dried. This procedure gives 1.7 part of brown powder. The powder is subjected to silica-gel column-chromatography using chloroform as a solvent.

This procedure gives (1) 1 part of 2-methyl-3-(2-hydroxy-3,4,6-trimethylbenzoyl)propionic acid as yellow needles melting at 179° to 184°C.
Elementary analysis: $C_{14}H_{18}O_4$
Calculated; C 67.18, H 7.25
Found ; C 67.18, H 7.35
and (2) 0.4 part of 3-methyl-3-(2-hydroxy-3,4,6-trimethyl-benzoyl)propionic acid as pale yellow silky needles melting at 138° to 139°C.
Elementary analysis: $C_{14}H_{18}O_4$
Calculated; C 67.18, H 7.25
Found ; C 67.36, H 7.44

2. In 2 volume parts of toluene is dissolved 0.5 part of 2-methyl-3-(2-hydroxy-3,4,6-trimethyl-benzoyl)propionic acid, and to the solution are added amalgamated zinc prepared from 1 part of zinc, 2 volume parts of concentrated hydrochloric acid and 2 volume parts of water, followed by heating under reflux for 20 hours.

After completion of the reaction, toluene layer is collected by separation, and water layer is extracted with ethyl ether. The extract is combined with the toluene layer, and the whole mixture is washed with water and dried over anhydrous sodium sulfate. The mixture is subjected to distillation to remove the solvents, and the residue is recrystallized from ethyl ether - petroleum ether to give 0.32 part of 2-methyl-4-(2-hydroxy-3,4,6-trimethylphenyl)butyric acid as colorless needles melting at 92° to 94°C.

Elementary analysis: $C_{14}H_{20}O_3$
Calculated; C 71.16, H 8.53
Found ; C 70.88, H 8.62

3. In 2 volume parts of a 1 weight percent aqueous solution of sodium hydroxide is dissolved 0.1 part of 2-methyl-4-(2-hydroxy-3,4,6-trimethylphenyl)butyric acid, and to the solution is added a solution of 0.3 part of potassium nitrosodisulfonate in 3 volume parts of water, followed by stirring at room temperature for 1 hour. After completion of the reaction, the reaction mixture is made acid with dilute hydrochloric acid, and the whole mixture is extracted with ethyl ether. The extract is washed with water, dried over anhydrous sodium sulfate, and then subjected to distillation to remove the solvent. The residue is recrystallized from ethyl ether - petroleum ether to give 0.09 part of 2,3,5-trimethyl-6-(3-carboxy-3-methylpropyl)-1,4-benzoquinone as yellow plates melting at 79° to 81°C.

Elementary analysis: $C_{14}H_{18}O_4$
Calculated; C 67.18, H 7.25
Found ; C 66.90, H 7.31

EXAMPLE 2

To a solution of 0.05 part of 2,3,5-trimethyl-6-(3-carboxy-3-methylpropyl)-1,4-benzoquinone in 1 volume part of ethyl ether is added dropwise 1 volume part of 5 weight percent ethyl ether solution of diazomethane, followed by stirring at room temperature for 10 minutes. After completion of the reaction, the reaction mixture is subjected to distillation to remove the solvent. The residue is subjected to silica-gel column-chromatography using chloroform as a solvent, and the chloroform solution is subjected to distillation to leave 2,3,5-trimethyl-6-(3-methoxycarbonyl-3-methylpropyl)-1,4-benzoquinone as a yellow oily substance.

Significant maximum absorption in ultraviolet absorption spectrum [$\lambda$ in $C_2H_5OH$, m$\mu$ ($E_{1cm}^{1\%}$) ] :
oxidized form; 261(622), 268(633)
reduced form; 288(84)

Significant maximum absorption in infrared absorption spectrum ($\nu$ film, cm$^{-1}$):
1740, 1170($COOCH_3$), 1650, 1630(quinone)

Elementary analysis: $C_{15}H_{20}O_4$
Calculated; C 68.16, H 7.63
Found ; C 67.87, H 7.73

What is claimed is:

1. A member selected from the group of a compound of the formula

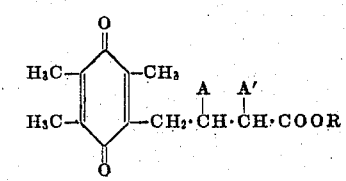

wherein one of A and A' is hydrogen and the other is a lower alkyl group, and R is a member of the group of alkyl, cycloalkyl and unsaturated alkyl having 1–6 carbon atoms, and pharmaceutically acceptable salts thereof.

2. A compound as claimed in claim 1, wherein A is hydrogen and A' is a lower alkyl group.

3. A compound as claimed in claim 1, wherein A is a lower alkyl group and A' is a hydrogen atom.

4. A compound as claimed in claim 1, said compound being 2,3,5-trimethyl-6-(3-methyl-3-methoxycarbonylpropyl)-1,4-benzoquinone.

5. A compound as claimed in claim 1, said compound being 2,3,5-trimethyl-6-(3-carboxy-3-methylpropyl)-1,4-benzoquinone.

* * * * *